US00RE41426E

(19) United States
(12) Reissued Patent
Park et al.

(10) Patent Number: US RE41,426 E
(45) Date of Reissued Patent: Jul. 13, 2010

(54) MANUFACTURING METHODS OF LIQUID CRYSTAL DISPLAYS

(75) Inventors: Woon-Yong Park, Kyungki-do (KR); Won-Hee Lee, Seoul (KR)

(73) Assignee: Samsung Electronics Co., Ltd., Gyeonggi-Do (KR)

(21) Appl. No.: 11/141,675

(22) Filed: May 31, 2005

Related U.S. Patent Documents

Reissue of:
(64) Patent No.: 6,022,753
Issued: Feb. 8, 2000
Appl. No.: 09/105,732
Filed: Jun. 26, 1998

U.S. Applications:
(63) Continuation of application No. 10/071,647, filed on Feb. 8, 2002, now Pat. No. Re. 38,901.

(30) Foreign Application Priority Data

May 11, 1998 (KR) ..... 98-16708

(51) Int. Cl.
*H01L 27/14* (2006.01)

(52) U.S. Cl. ..... 257/72; 257/59; 257/E29.117; 438/30; 438/158; 438/160; 438/949

(58) Field of Classification Search ..... 257/59, 257/72, E29.117; 349/40
See application file for complete search history.

(56) References Cited

U.S. PATENT DOCUMENTS 4,678,542 A 7/1987 Boer et al.
5,198,377 A 3/1993 Kato et al.
5,441,905 A 8/1995 Wu
5,525,527 A 6/1996 Tran
5,672,523 A 9/1997 Yamamoto et al.
5,733,804 A 3/1998 Hack et al.
5,756,371 A 5/1998 Ohno et al.
5,920,082 A 7/1999 Kitazawa et al.
6,587,160 B2 * 7/2003 Kim et al. ..... 349/40

FOREIGN PATENT DOCUMENTS

JP 10-020341 1/1998
KR 1989-0010601 8/1989
KR 10-0262227 4/2000

* cited by examiner

*Primary Examiner*—Bradley K Smith
(74) *Attorney, Agent, or Firm*—Innovation Counsel LLP

(57) ABSTRACT

An ITO (indium tin oxide) layer and a negative photoresist are deposited sequentially on the substrate 100 having a gate wire, a storage wire, a data wire and a storage electrode. The negative photoresist is developed through front exposure and the ITO layer is etched to form a pixel electrode. Because the portions of negative photoresist exposed to light remain after development, pixel defects due to particles placed between pixel regions are reduced. Both the rear exposure and the front exposure may be used. In the rear exposure, it is difficult to remain the portions of the ITO layer at the positions corresponding to the contact portion of the drain electrode and the pixel electrode, the storage line, the gate pads and the data pads. Accordingly, the front exposure is then executed by using the first mask having openings thereon. The negative photoresist is developed, and the ITO layer is patterned. After etching the ITO layer, because the portion of the ITO layer outside the display region remains as a whole, the portions of the ITO layers on the gate pads and the data pads remains through front exposure using a positive photoresist.

7 Claims, 23 Drawing Sheets

MANUFACTURING METHODS OF LIQUID CRYSTAL DISPLAYS

Matter enclosed in heavy brackets [ ] appears in the original patent but forms no part of this reissue specification; matter printed in italics indicates the additions made by reissue.

*This application is a continuation of prior application Ser. No. 10/071,647 filed Feb. 8, 2002, now U.S. Pat. No. RE 38,901, which is a reissue of application Ser. No. 09/105,732 now U.S. Pat. No. 6,022,753.*

BACKGROUND OF THE INVENTION (a) Field of the Invention

The present invention relates to manufacturing methods of liquid crystal displays (hereinafter "LCD").

(b) Description of the Related Art

In general, a liquid crystal display includes two panels, a liquid crystal material interposed therebetween, and electrodes formed on the inner surfaces of the panels to control a photo transmittance for adjusting the voltage applied.

A pixel electrode made of a transparent conductive material such as ITO (indium tin oxide) and displaying images is located in each pixel region of the liquid crystal display. The pixel electrode is driven by signals supplied from signal lines such as gate lines and data lines defining the pixel regions. In detail, the pixel electrode is connected to the signal lines via a switching device such as thin film transistor (hereinafter "TFT"). The switching device controls image signals supplied from the data line to output to the pixel electrode responsive to scanning signals supplied from the gate line. Furthermore, a storage line for storing the image signal supplied to the pixel electrode until the next image signal is applied.

Generally, a positive photoresist is used, when patterning a transparent conductive layer to form the pixel electrode.

However, if particles which block the light incident to the photoresist are placed on the photoresist between the pixel regions, the portions of the positive photoresist under the particles are not removed after development. As a result, conductive patterns between the pixel regions may be remained, and the pixel electrodes in the adjacent pixel regions may be shorted through the conductive patterns.

In the mean time, in order to increase the aperture ratio of the LCD, the pixel electrode and the signal lines may align with each other. However, considering aligning margin of manufacturing process, the pixel electrode and the data line may overlap, and the considerable parasitic capacitance generated therebetween increases.

To decrease this parasitic capacitance, the thickness of an insulating layer interposed between the pixel electrode and the data line may increase. However, this may cause the storage capacitance between the pixel electrode and the storage line to decrease.

Furthermore, in case of using a stepper as an exposure device to exposing the photoresist in unit of block, if misalign is generated between the blocks, the overlapping area of the pixel electrode and the data line is different between the blocks. Accordingly, the parasitic capacitance is different between the blocks.

SUMMARY OF THE INVENTION

In view of the above, it is an object of the present invention to prevent the short between pixel electrodes.

In view of the above, it is another object of the present invention to reduce the parasitic capacitance.

It is another object of the present invention to remove the stitch defect of a liquid crystal display.

These and other objects are provided, according to the present invention, by using a negative photoresist and front exposure to form a pixel electrode. In detail, a negative photoresist is coated on a transparent conductive layer formed over the front surface of the substrate. Next, the front exposure that light is irradiated from the front of the substrate is executed to remain the photoresist on the transparent conductive layer corresponding to the pixel region, and the transparent conductive layer is etched by using the remaining photoresist as an etch mask.

In this manufacturing method according to the present invention, though there exist particles between the pixel regions, a conductive pattern due to the particles is not formed, because the portion of the negative photoresist which is located under the particles blocking light is removed.

Another manufacturing method according to the present invention to solve theses objects uses a negative photoresist, a front exposure, and a rear exposure to from a pixel electrode connected to the drain electrode via a contact hole. At this time, the rear exposure that light is irradiated from the rear surface of the substrate is executed by using gate lines and data lines, which are formed on the front surface of the substrate, as an exposure mask. Next, the front exposure is executed by using a mask having an opening at the position corresponding to the drain electrode In the manufacturing method of the liquid crystal display according to the present invention, the pixel electrode is aligned with the gate lines and the data lines, because the pixel electrode is formed through rear exposure using the gate lines and the data lines as an exposure mask.

DETAILED DESCRIPTION OF THE PREFERRED EMBODIMENTS

The present invention will now be described more fully hereinafter with reference to the accompanying drawings, in which preferred embodiments of the present invention are shown. This invention may, however, be embodied in different forms and should not be construed as limited to the embodiments set forth herein Rather, these embodiments are provided so that this disclosure will be thorough and complete, and will fully convey the scope of the invention the those skilled in the art.

First, the structure of a TFT substrate for an LCD according to the first embodiment of the present invention will now be described specifically with reference to FIGS. 1~4.

Figure 1:
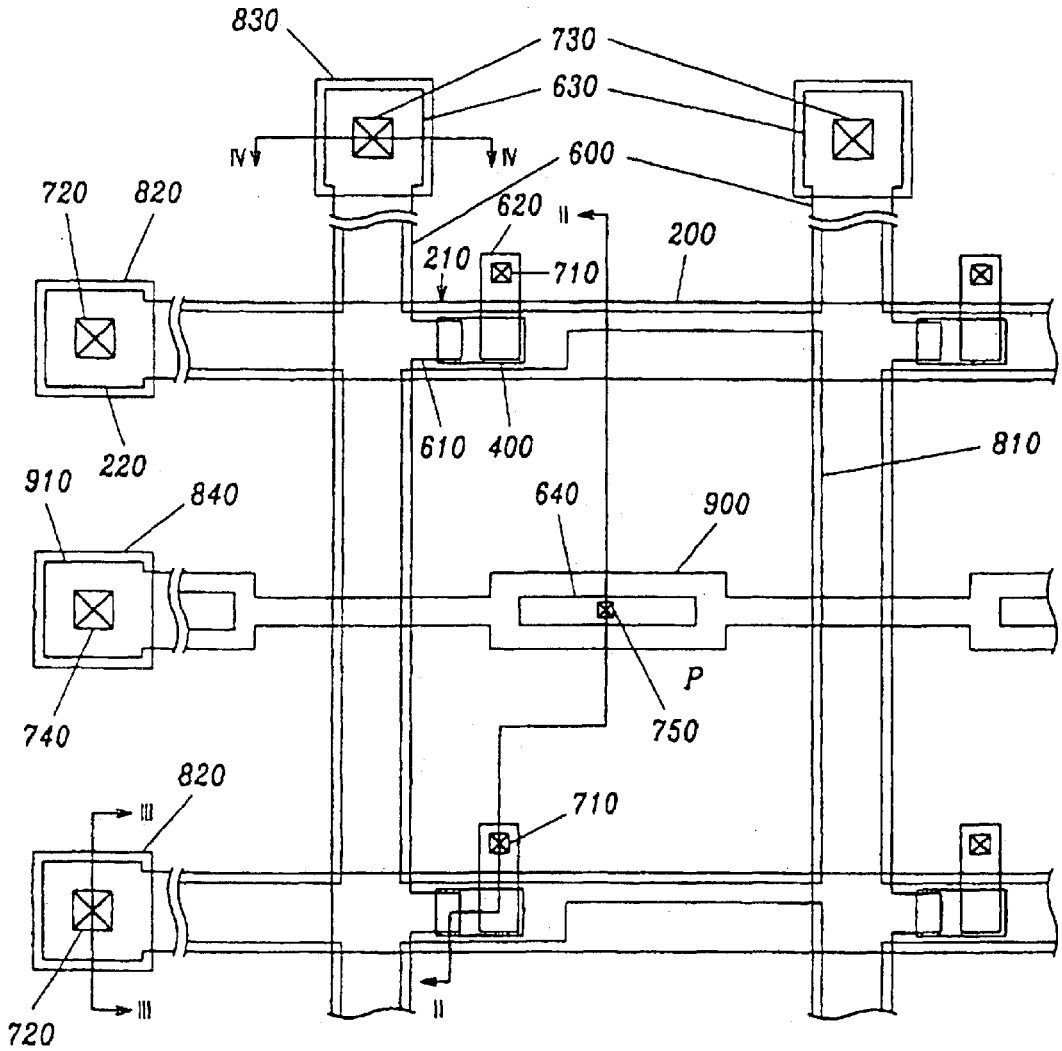
FIG. 1 is a layout view of a TFT substrate for an LCD according to the first embodiment of the present invention.
Figure 2:
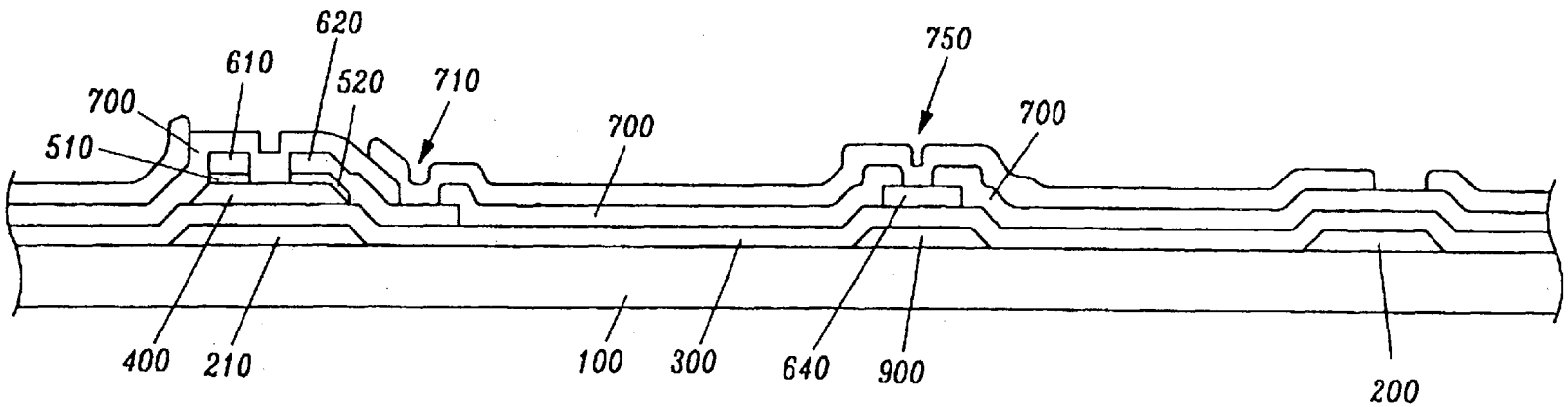
FIG. 2 shows a cross-sectional view of the TFT substrate illustrated in FIG. 1 taken along the line II—II.
Figure 3:
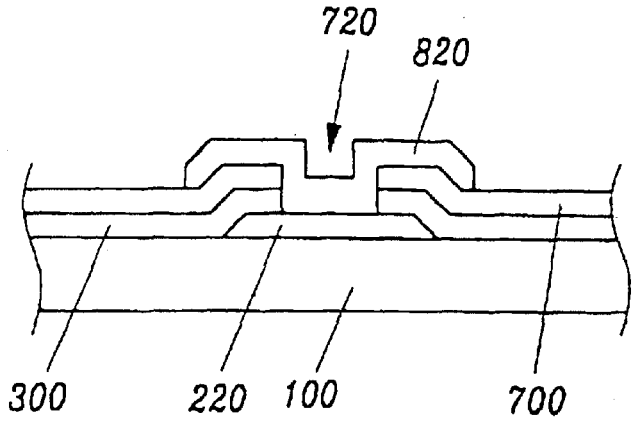
FIG. 3 shows a cross-sectional view of the TFT substrate illustrated in FIG. 1 taken along the line III—III.
Figure 4:
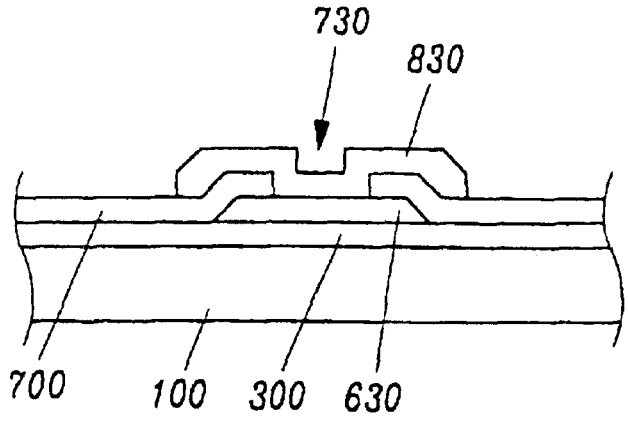
FIG. 4 shows a cross-sectional view of the TFT substrate illustrated in FIG. 1 taken along the line IV—IV.

FIG. 1 is a layout view of a TFT substrate for an LCD according to the first embodiment of the present invention, FIG. 2 shows a cross-sectional view of the TFT substrate in FIG. 1 taken along the line II—II, FIG. 3 shows a cross-sectional view of the TFT substrate in FIG. 1 taken along the line III—III, and FIG. 4 shows a cross-sectional view of the TFT substrate in FIG. 1 taken along the line IV—IV.

A gate wire having gate lines 200 including a gate electrode 210, and gate pads 220 which are connected to one ends of the gate lines 200 and located outside a display region is formed in the transverse direction on a transparent substrate 100. The gate pads 220 are paths to transmit scanning signals from the outside to the gate line 200. Furthermore, a storage wire having a storage line 900 and a storage pad 910 which is connected to one end of the storage line 900 and located outside the display region is formed in the transverse direction on the substrate 100.

A gate insulating layer 300 covers the gate wire 200, 210 and 220, and the storage wire 900 and 910, and has contact holes 720 and 740 respectively exposing the gate pad 220 and the storage pad 910. An hydrogenated amorphous silicon (a-si:H) layer 400 and a doped hydrogenated amorphous silicon layer 510 and 520 with N type impurity are sequentially formed on the portion of the gate insulating layer 300 above the gate electrode 210, and the portions 510 and 520 of the doped amorphous silicon layer are opposite with respect to the gate electrode 210. Here, the amorphous silicon layer 400 is used as a channel layer of a TFT, and the doped amorphous silicon layer 510 and 520 are used as a contact resistance layer to decrease the contact resistance between the amorphous silicon layer 400 and metal electrodes. Another material may be used as the channel layer instead of the amorphous silicon.

Data lines 600 defining a pixel region P along with the gate lines 200 are formed on the gate insulating layer 300, and data pads 630 for transmitting image signals from the outside to the data line 600 are connected to one ends of the data line 600. A source electrode 610 which is a branch of the data line 600 is formed on the one portion 510 of the doped amorphous silicon layer, and a drain electrode 620 is formed on the other portion 520 of the doped amorphous silicon layer. Furthermore, a storage electrode 640 is formed in the transverse direction on the portion of the gate insulating layer 300 of the over storage line 900. Here, it is desirable to form the source electrode 610, the amorphous silicon layer 400, and the doped amorphous silicon layer 510 and 520 to lie within the gate line 200 to increase the aperture ratio, and to minimize the portion of the drain electrode 620 which is exposed outside the gate line 200.

A passivation layer 700 is formed on a data wire 600, 610, 620 and 630 and on portions of the amorphous silicon layer 400, which are not covered by the data wire. The passivation layer 700 has contact holes 710, 720, 730, 740 and 750 exposing the drain electrode 620, the gate pad 220, the data pad 630, the storage pad 910, and the storage electrode 640, respectively.

The gate electrode 210, the gate insulating layer 300, the channel layer 400, the doped amorphous layer 510 and 520, and the source and drain electrode 610 and 620 form a TFT which is transmits the image signal from the data line 600 responsive to the scanning signal from the gate line 200.

Finally, a pixel electrode 810 made of transparent conductive material such as ITO (indium tin oxide) and connected to the drain electrode 620 and the storage electrode 640 through the contact holes 710 and 750 is formed on the passivation layer 700. At this time, the pixel electrode 810 is aligned with the gate line 200 connected to the pixel electrode 810 via the TFT, the gate electrode 210 of the previous gate line 200 which is adjacent to the pixel electrode 810 but not connected to the pixel electrode 810, and the data line 600, and the pixel electrode 810 overlaps the gate electrode 210 of the previous gate line 200 and the data line 600 with the narrow width of about 1 μm or less. However, the pixel electrode 810 overlaps the portion of the previous gate line 200 except the gate electrode 210 with the wider width to increase a storage capacity.

On the other hand, a gate ITO layer 820 which is connected to the gate pad 220 through the contact hole 720 and transmits scanning signals from outside to the gate line 200, a data ITO layer 830 which is connected to the data pad 630 through the contact hole 730 and transmits image signals from outside to the data line 600, and a storage ITO layer 840 which is connected to the storage pad 910 through the contact hole 740 and transmits storage signals from outside to the storage line 900 are formed on the passivation layer 700

Here, the structure of a storage pad is similar to that of the gate pad shown in FIG. 3, and a display region is comprised of the pixel regions P.

Next, manufacturing methods of the TFT substrate of FIGS. 1~4 will now be described specifically.

First, the case of forming a pixel electrode by using a negative photoresist and by a front exposure will be described with reference to FIGS. 5A~5D and FIGS. 6A~6D.

Figure 5A:
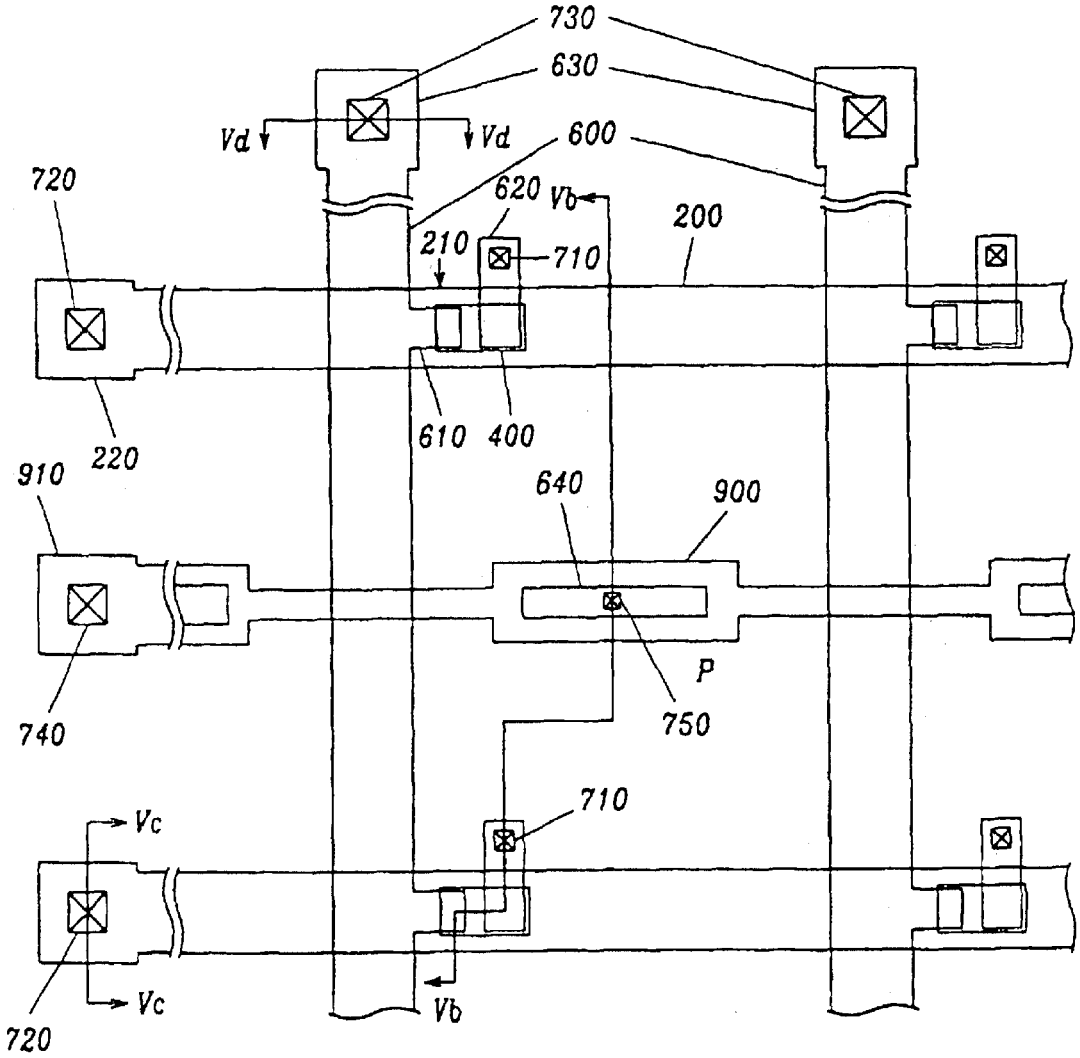
FIGS. 5A~5D, FIGS. 6A~6D, FIGS. 7A~7D, FIGS. 8A~8D, FIGS. 9A~9D and FIGS. 10A~10D are cross-sectional views showing the manufacturing process of the TFT substrate shown in FIG. 1.
Figure 5B:
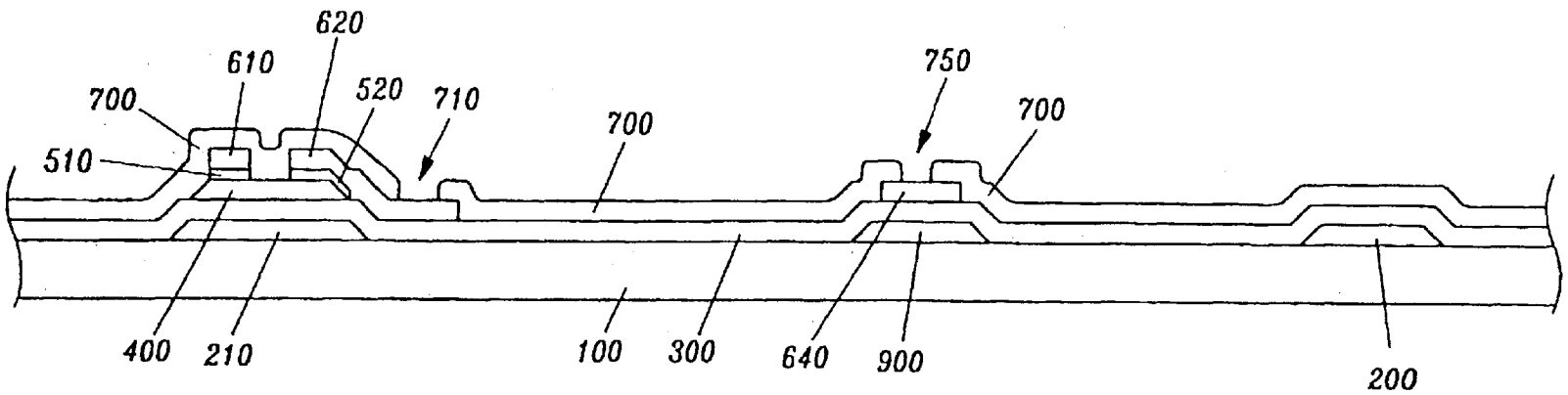
Figure 5C:
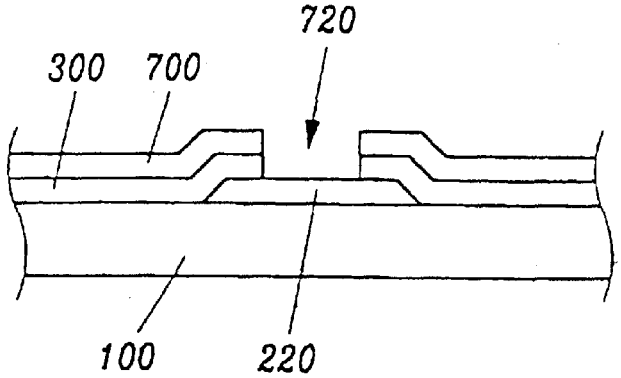
Figure 5D:
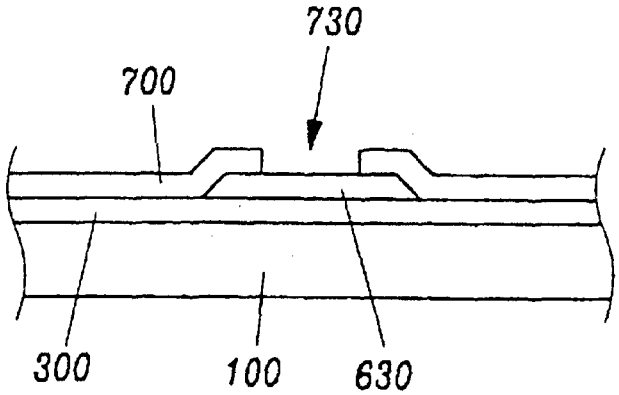
Figure 6A:
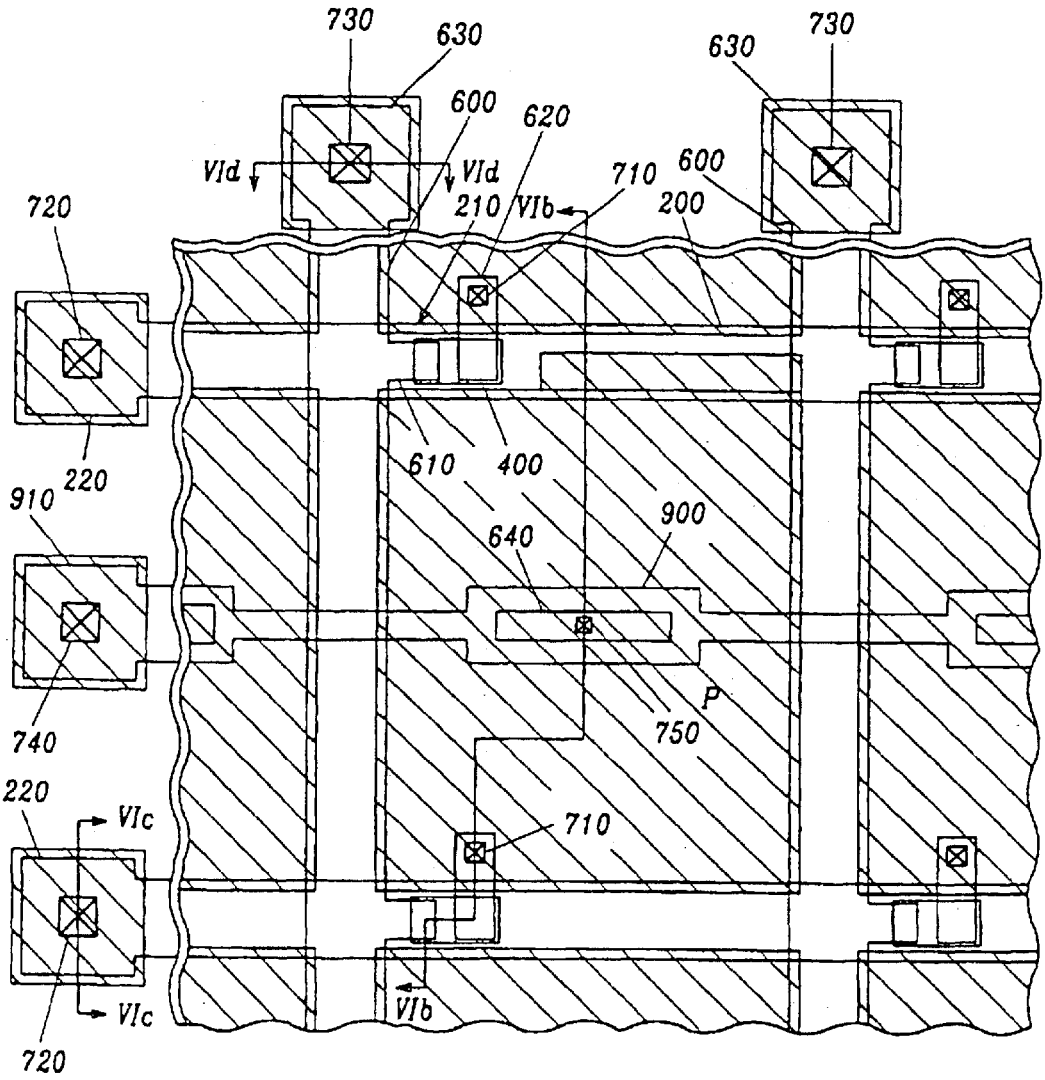
Figure 6B:
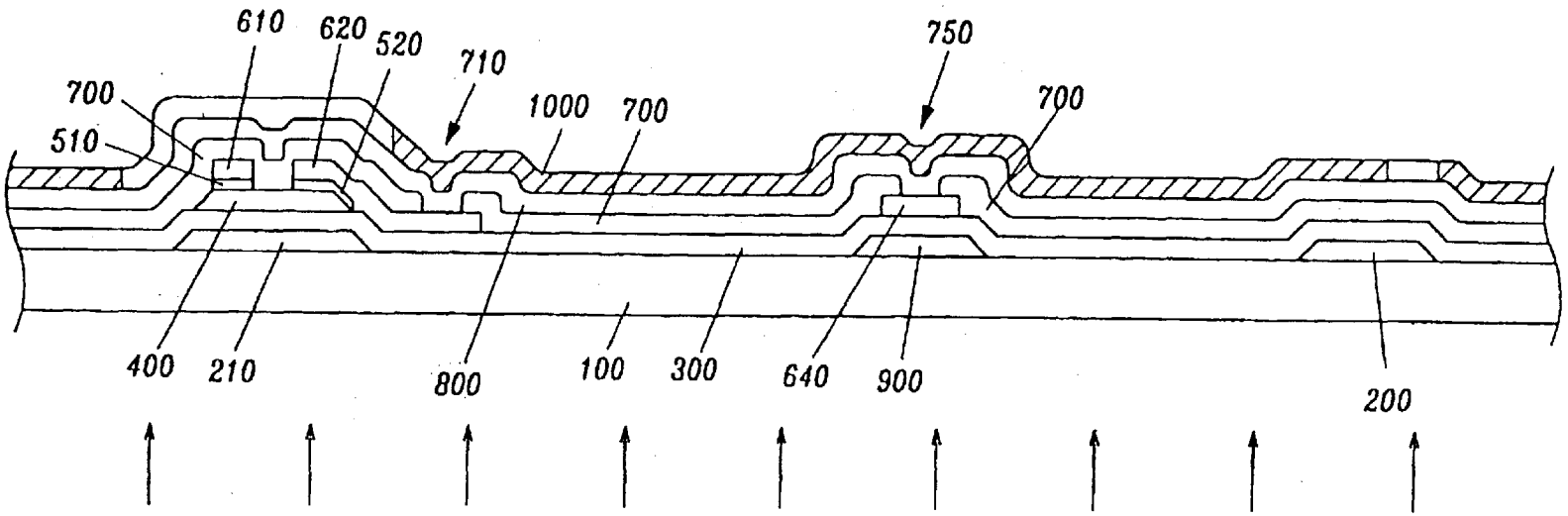
Figure 6C:
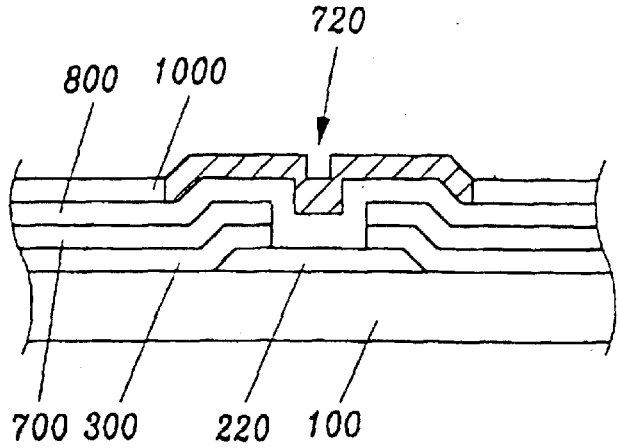
Figure 6D:
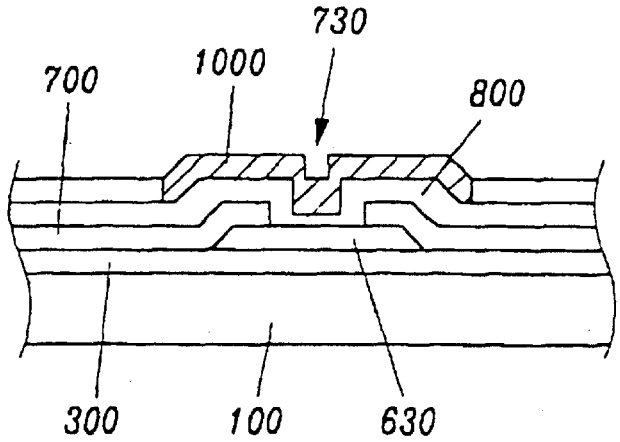

Here, FIGS. 5A and 6A are layout views of the TFT substrate for the LCD, FIGS. 5B and 6B show cross-sectional views of the TFT substrate taken along the line VB and VIB in FIGS. 5A and 6A, FIGS. 5C and 6C show cross-sectional views of the TFT substrate taken along the line VC and VIC in FIGS. 5A and 6A, and FIGS. 5D and 6D show cross-sectional views of the TFT substrate taken along VD and VID in FIGS. 5A and 6A, respectively.

As shown in FIGS. 5A, 5B, 5C and 5D, a conductive material is deposited on a transparent insulating substrate 100 and patterned to form a gate line 200, a gate electrode 210 and a gate pad 220 and to form a storage line 900 and a storage pad 910. Next, a gate insulating layer 300 made of silicon nitride. a hydrogenated amorphous silicon layer 400 and an extrinsic or doped hydrogenated amorphous silicon layer heavily doped with N type impurity are sequentially deposited, and the extrinsic amorphous silicon layer and the amorphous silicon layer 400 is patterned by photolithography. Next, a conductive material is deposited and patterned to form a data wire including of a data line 600, a source electrode 610, a drain electrode 620, a data pad 630 and a storage electrode 640 by photolithography. Then, the extrinsic amorphous silicon layer is etched by using the data wire 600, 610, 620, and 630 as an etch mask to divide the extrinsic amorphous silicon layer into portions 510 and 520, and to expose the portion of the amorphous silicon layer 400 therebetween. Next, a passivation layer 700 is deposited and patterned along with the gate insulating layer 300 by photolithography to have contact holes 710, 720, 730, 740 and 750 on the drain electrode 620, the gate pad 220, the data pad 630, the storage pad 910 and the storage electrode 640, respectively.

The bottom gate type TFT that the gate wire and the storage wire, the gate insulating layer, the amorphous silicon layer, the extrinsic amorphous silicon layer, the data wire and the storage electrode, and the passivation layer are formed sequentially is described in the above embodiment of the present invention. However, a top gate type TFT that the channel layer, the gate insulating layer, the gate wire, a interlayer insulating film, the data wire, and the passivation layer are formed sequentially may be adapted, and otherwise another structure of the TFT may be adapted.

As shown in FIGS. 6A, 6B, 6C and 6D, an ITO layer 800 as a transparent conductive layer and a negative photoresist 1000 which remains when exposed by light are deposited sequentially over the substrate 100. Next, the front exposure that light is irradiated from the front side of the substrate 100 is executed by using the mask having opening pattern over the portions of the negative photoresist 1000 on the pixel region P, the gate pad 220 and the data pad 630. Here, the exposed portions of the negative photoresist 1000 to light are respected as the hatched region in FIGS. 6A, 6B, 6C and 6D. Finally, the hatched portions remain after development, and the ITO layer 800 is etched by using the remaining photoresist as an etch mask to form a pixel electrode 810, a gate pad electrode 820 and a data pad electrode 830 in FIGS. 1~4.

According to this manufacturing method for forming the pixel electrode 810 by using the negative photoresist, pixel defects decrease compared with when using a positive photoresist through the front exposure. It is because the mask exposing the portions between the pixel regions P, that is, the portions in which there are the gate line 200 and the data line 600, etc., in case of the latter. At this time, if there exist particles on the portions and they block the incident light, the portions of the positive photoresist under the particles remain after development. As a result, some ITO patterns between the pixel regions P may remain, the pixel electrodes in the adjacent pixel regions P may be shorted through the ITO patterns. However, this problem is not generated in this embodiment, because unexposed portions of the negative photoresist to light is removed.

Furthermore, in this manufacturing method, the pixel electrode 810 overlaps the gate line 200, the gate electrode 210 and the data line 600, but the pixel electrode 810 may not overlap them.

Next, the case of forming a pixel electrode by using a negative photoresist, and both a front exposure and a rear exposure will be described with reference to FIGS. 5A~5D, 7A~7D, 8A~8D and 9A~9D.

Figure 7A:
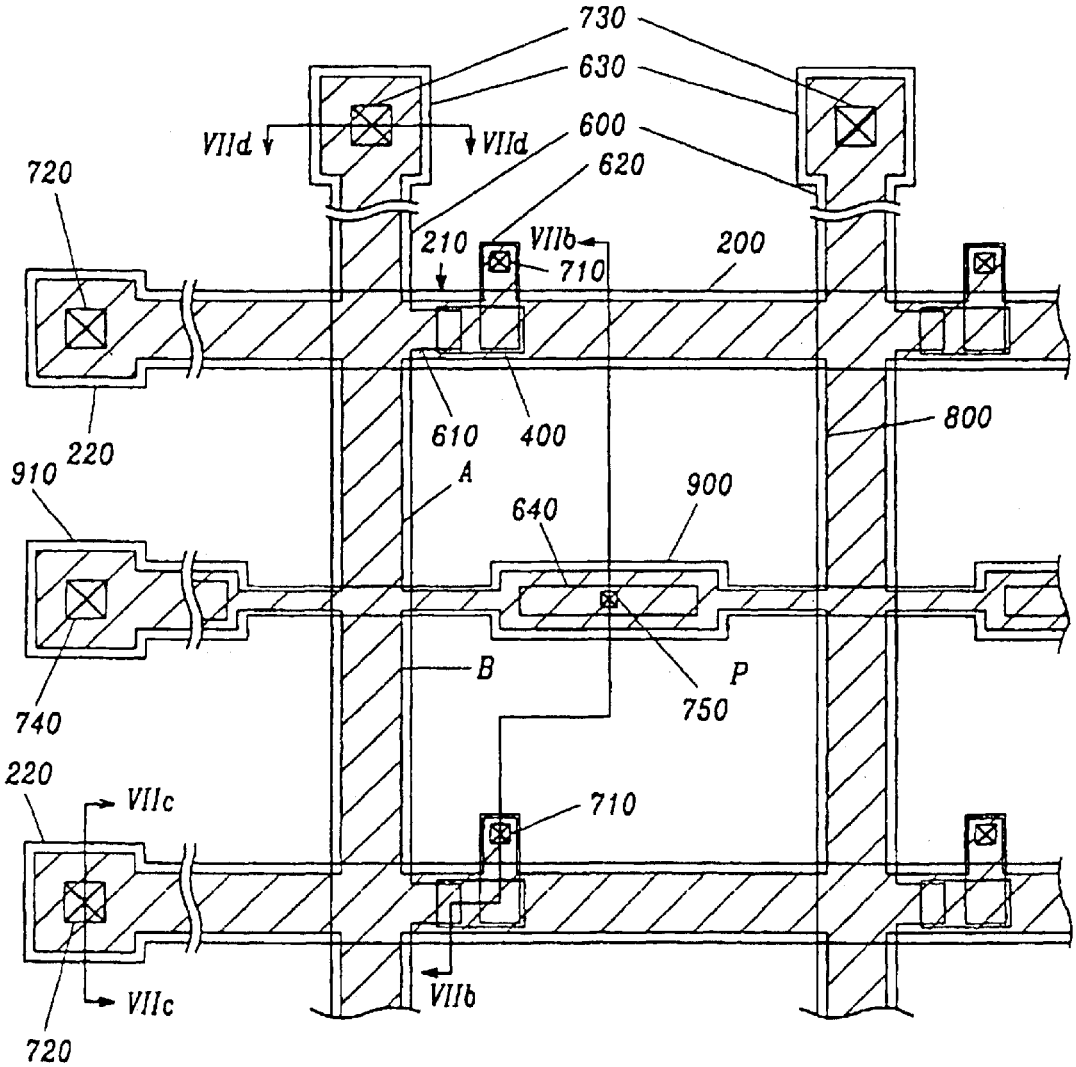
Figure 7B:
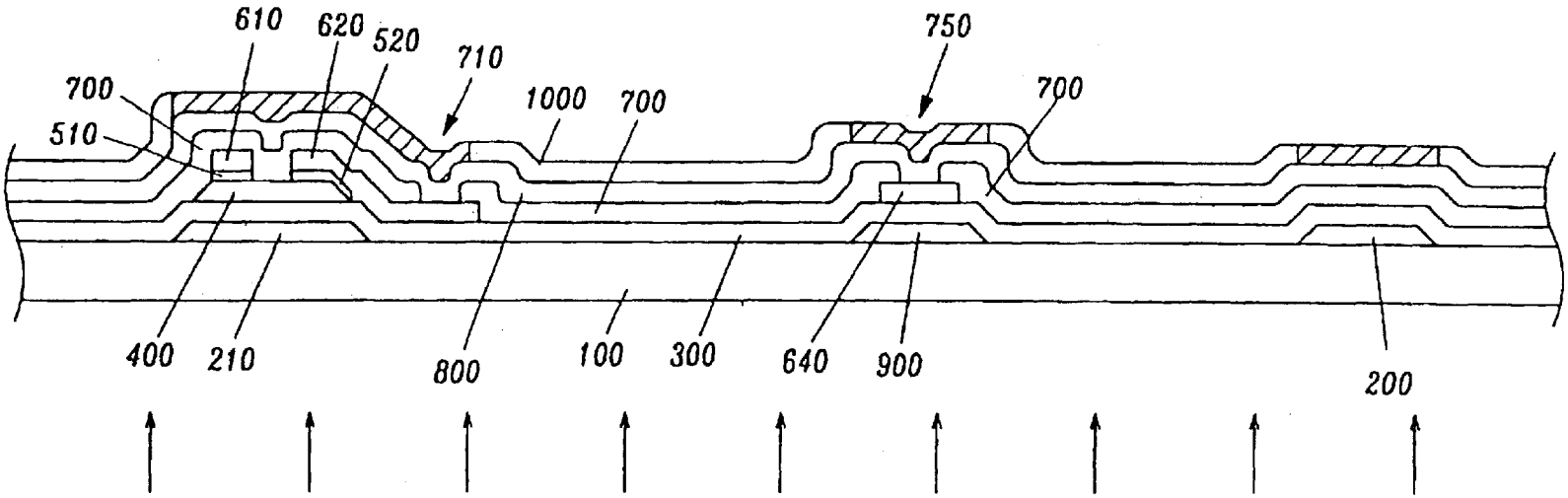
Figure 7C:
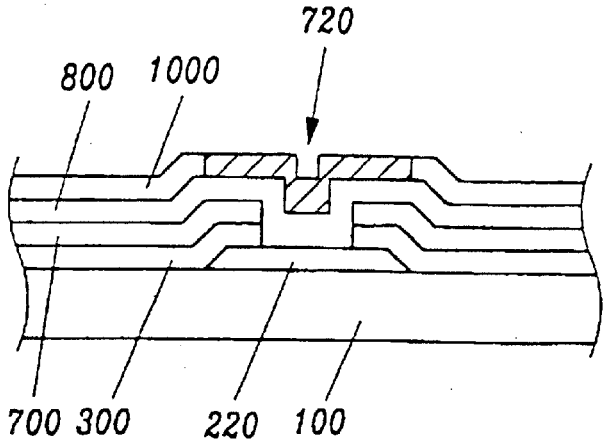
Figure 7D:
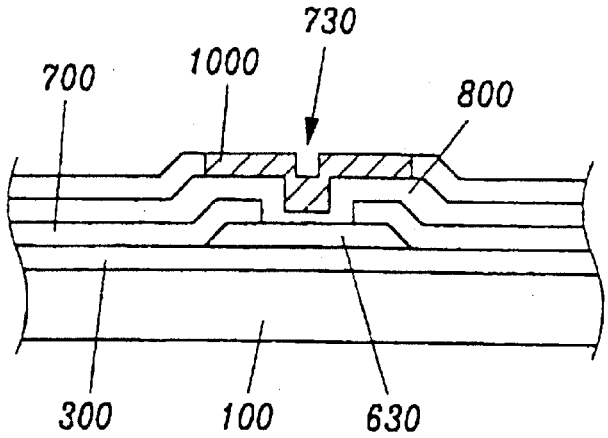
Figure 8A:
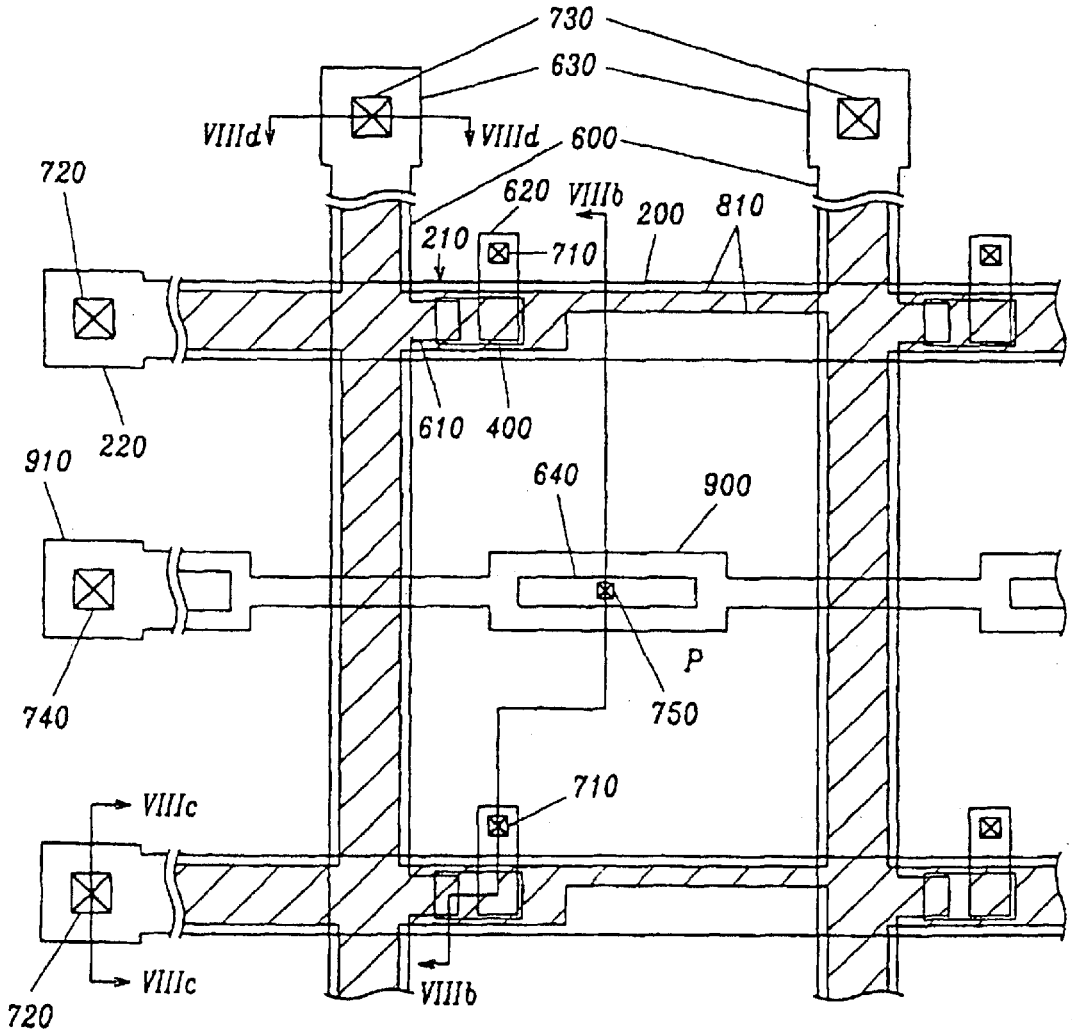
Figure 8B:
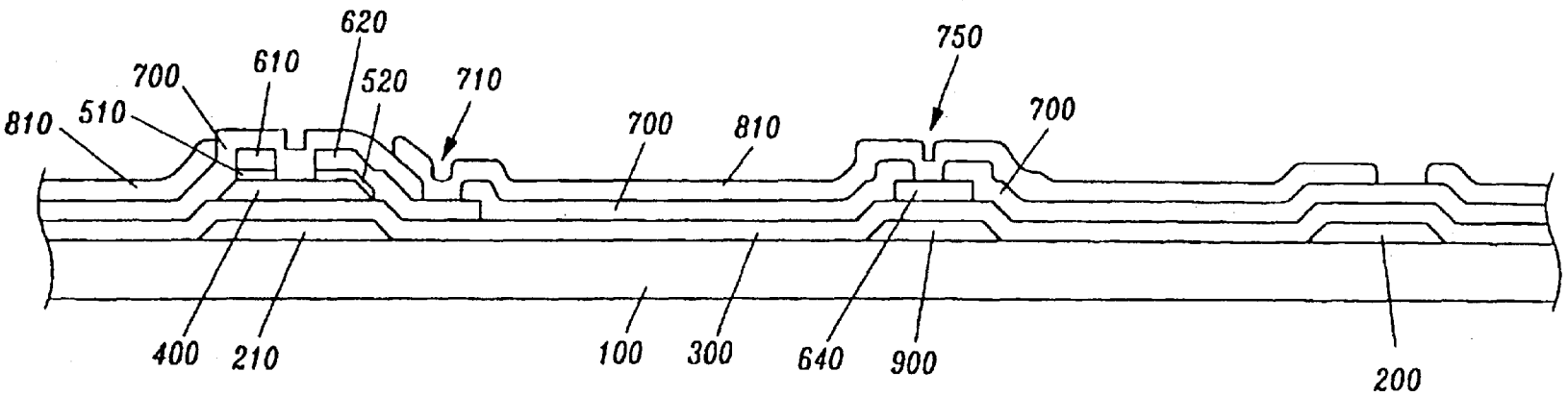
Figure 8C:
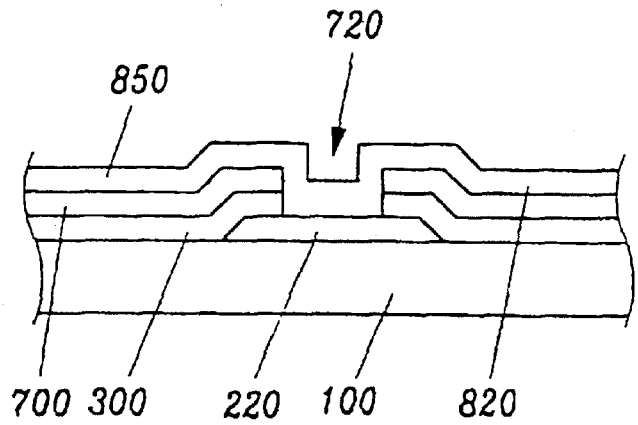
Figure 8D:
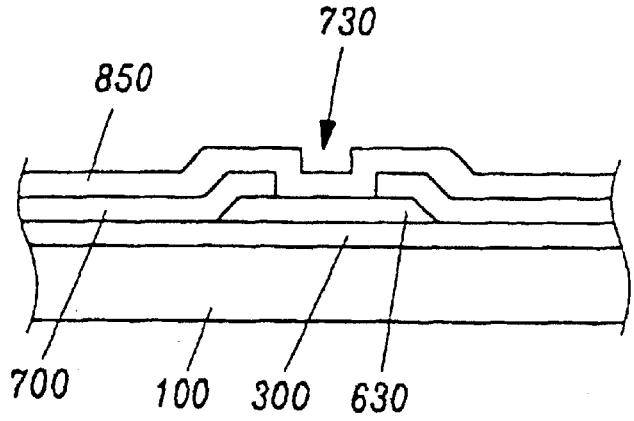
Figure 9A:
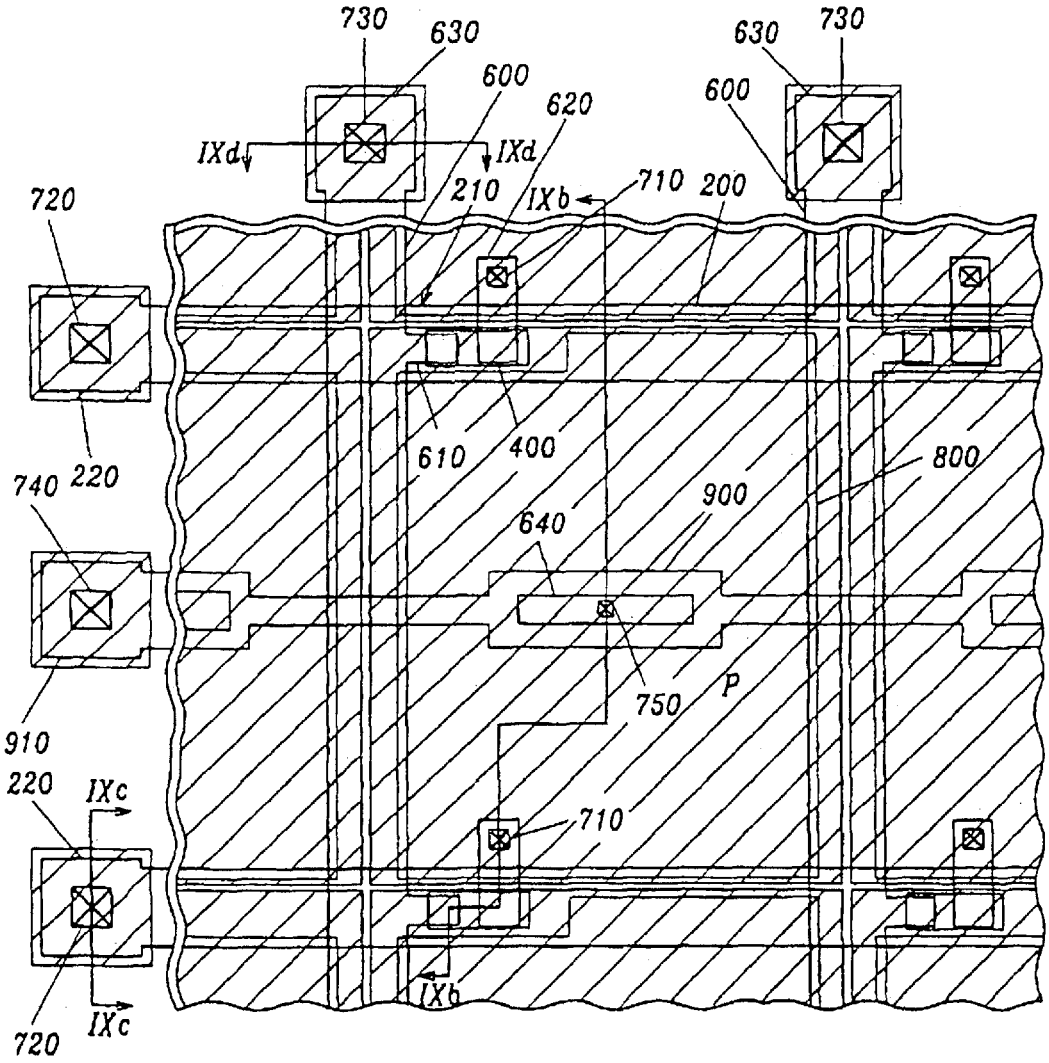
Figure 9B:
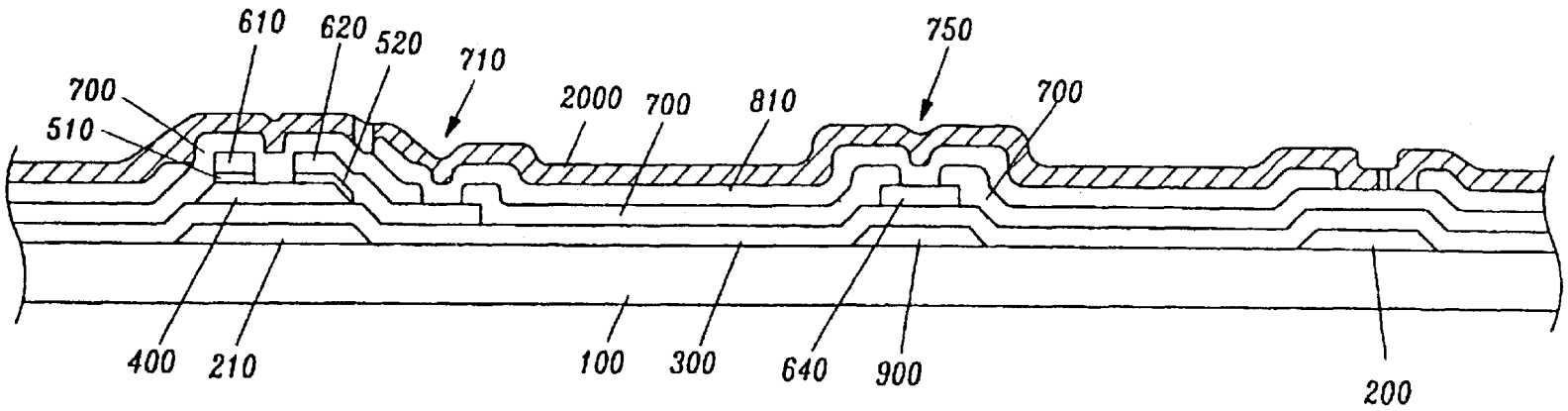
Figure 9C:
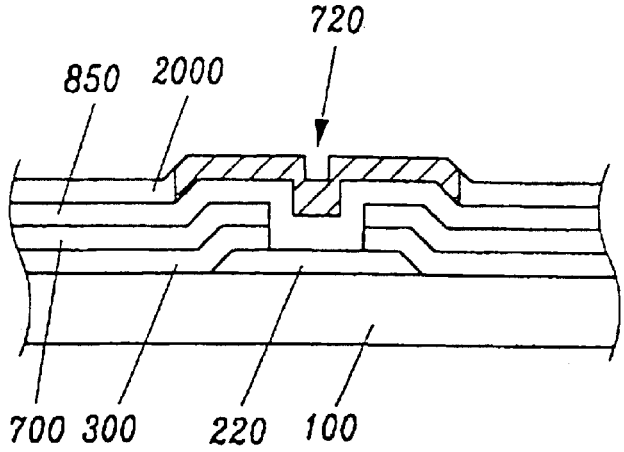
Figure 9D:
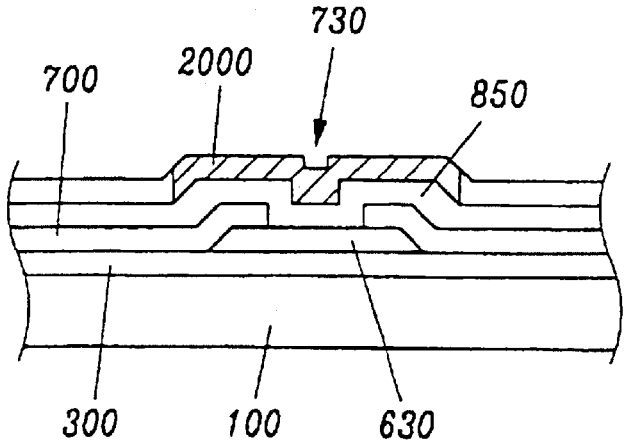

Here, FIGS. 7A, 8A and 9A are layout views of the TFT substrate for the LCD, FIGS. 7B, 8B and 9B show cross-sectional views of the TFT substrate taken along the line VIIB, VIIIB and IXB, FIGS. 7C, 8C and 9C show cross-sectional views of the TFT substrate taken along the line VIIC, VIIIC and IXC, and FIGS. 7D, 8D and 9D show cross-sectional views of the TFT substrate taken along the line VIID, VIIID and IXD, respectively.

As shown in FIGS. 7A, 7B, 7C and 7D, an IT0 layer 800 as a transparent conductive layer and a negative photoresist 1000 are deposited sequentially on a substrate 100 shown in FIGS. 5A~5D. Next, the rear exposure that light is irradiated from the rear side of the substrate 100 is executed. Because the gate wire 200, 210 and 220, the data wire 600, 610, 620 and 630, the storage wire 900 and 910 and the storage electrode 640 block the light incident from the rear side of the substrate 100, the portions of the negative photoresist 1000 which are not exposed to light are the hatched regions in FIGS. 7A, 7B, 7C and 7D.

However, if the ITO layer 800 is patterned using this photoresist 1000 as an etch mask, as shown in FIGS. 7A, 7B, 7C and 7D, not only a pixel electrode will be divided into two portions A and B, but also will not be connected to the drain electrode 620. Furthermore, the ITO layer will not remain above the gate pad 220 and the data pad 630, and it remains around the gate pad 20 and the data pad 630. Therefore, the front exposure is then executed by using the first mask having opening patterns on the portions corresponding to the drain electrode, the portions of the storage line 900 except for the portions overlapping the data line 600, the gate pad 220 and the data pad 630. The photoresist 1000 is developed, and the photoresist pattern corresponding to the pixel electrode remains in a pixel region P, but the photoresist pattern outside a display region remains as a whole. Thereafter, the ITO layer 800 is etched by using the remaining negative photoresist pattern as an etch mask, as shown in FIGS. 8A, 8B, 8C and 8D, and a pixel electrode 810 in display region and an ITO pattern 850 are formed. A hatched region in FIG. 8A represents the portion without the ITO layer.

According to this manufacturing method, pixel defects decrease compared with when using a positive photoresist through the front exposure as described previously.

Here, when the capacitance of a storage capacitor including the storage line 900 and the storage electrode 640 is not enough, the pixel electrode 810 may sufficiently overlap a previous gate line 200 as shown in FIGS. 8A and 8B.

In this embodiment, the pixel electrode 810 is formed through the rear exposure and the front exposure in sequence, but two exposing steps may be exchanged.

However, as shown in FIGS. 8A, 8B, 8C and 8D, the ITO pattern 850 outside the display region remains as a whole. Therefore, it is necessary to remain the ITO layer only on the gate pad 220 and the data pad 630.

Accordingly, as shown in FIGS. 9A, 9B, 9C and 9D, a positive photoresist 2000 is coated and exposed by using the second mask covering the portions corresponding to the gate pad 220 and the data pad 630. At this time, the second mask may have the pattern exposing the portion between the pixel electrodes 810 to ensure the separation of the pixel electrodes 810. The hatched portions in FIGS. 9A, 9B, 9C and 9D represents the portions, which are not exposed to light and where the positive photoresist 2000 remains. The ITO layer is etched by using the remaining positive photoresist 2000 as an etch mask to form a gate ITO layer 820 and a data ITO layer 830 in FIGS. 1, 3 and 4.

In the manufacturing method of the liquid crystal display according to the first embodiment of the present invention, the pixel electrode 810 is aligned with the gate line 200 and the data line 600, because the pixel electrode 810 is formed by using the rear exposure and the negative photoresist.

Therefore, the parasitic capacitance between the data line 600 and the pixel electrode 810 can be reduced, and the thickness of the passivation layer 700 may be reduced.

Furthermore, to reduce a manufacturing cost, the step using the positive photoresist is omitted. This manufacturing method of the TFT substrate will now be described specifically with reference to FIGS. 5A~5D and 10A~10D.

Figure 10A:
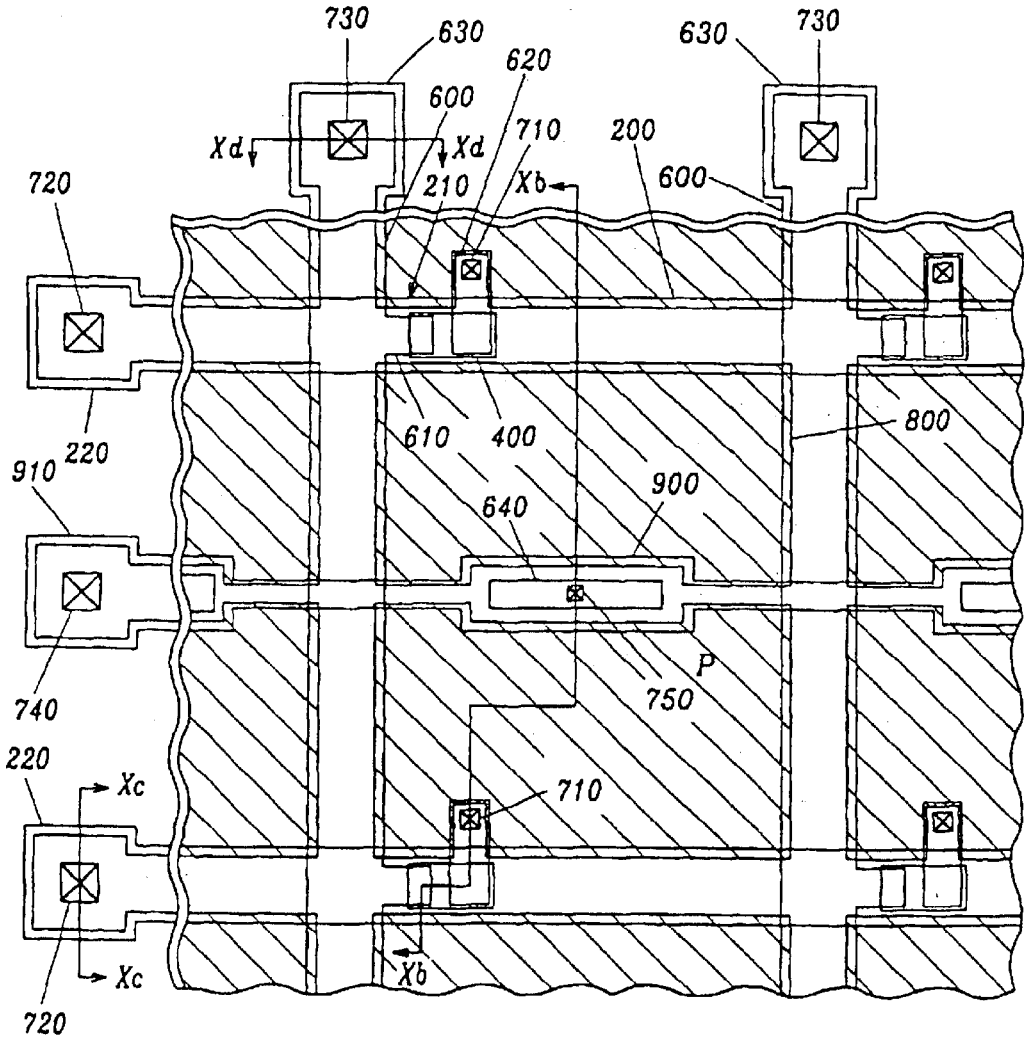
Figure 10B:
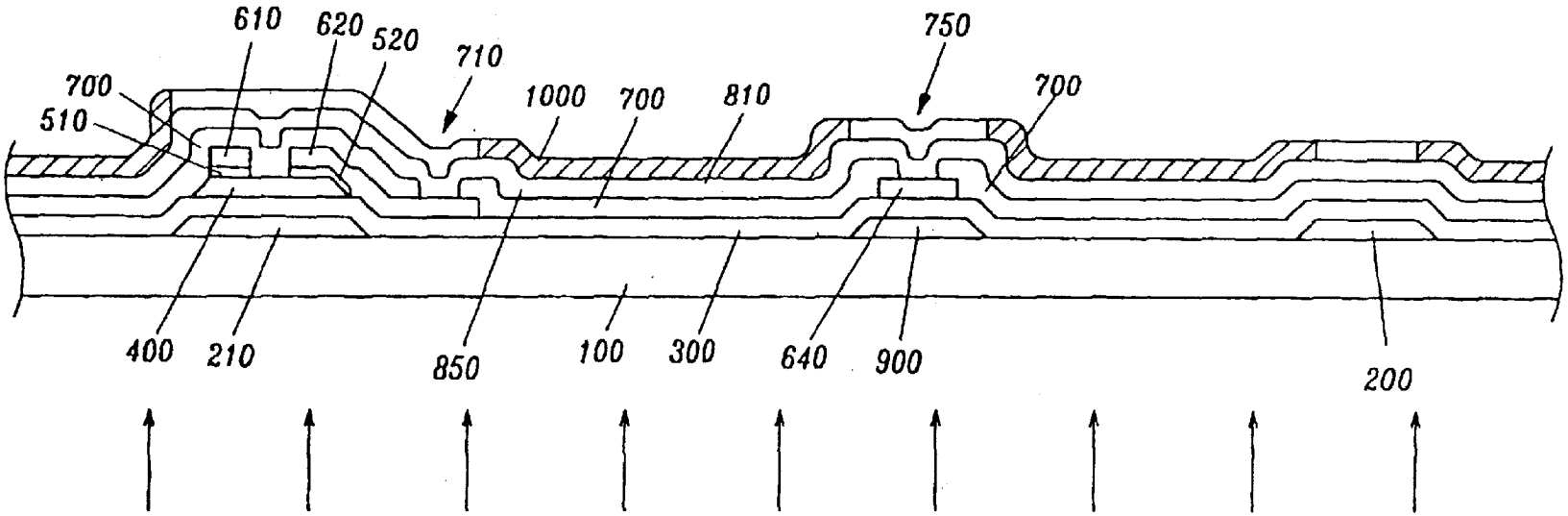
Figure 10C:
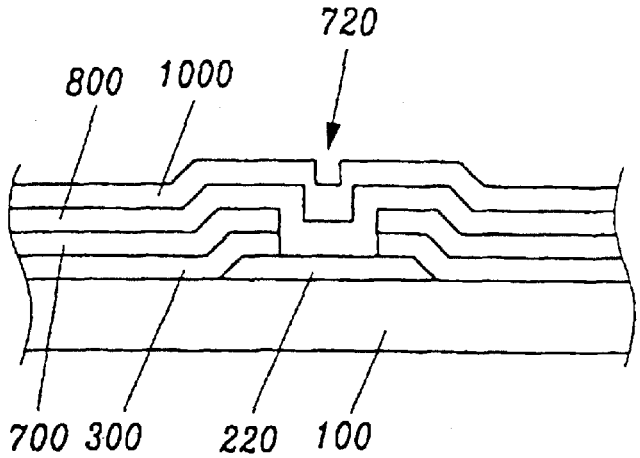
Figure 10D:
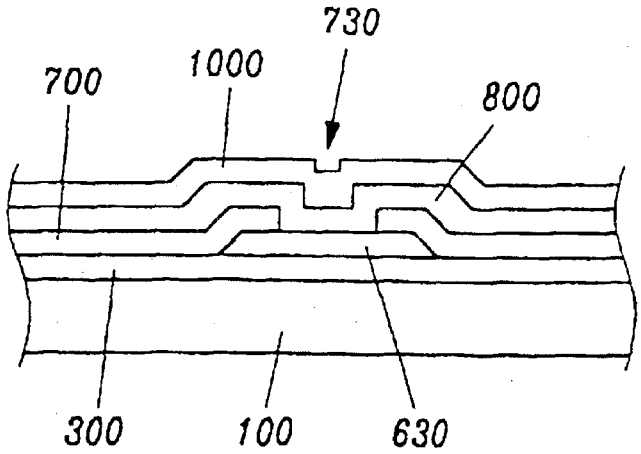

Here, FIG. 10A is layout view of the TFT substrate for the LCD, FIG. 10B shows a cross-sectional view of the TFT substrate taken along the line XB, FIG. 10C shows a cross-sectional view of the TFT substrate taken along the line XC, and FIG. 10D shows a cross-sectional view of the TFT substrate taken along the line XD, respectively.

An ITO layer 800 and a negative photoresist 1000 are deposited sequentially on the substrate 100 in FIGS. 5A, 5B, 5C and 5D. Next, a rear exposure is executed. At this time, a plate blocking the incident light outside the display region, in which the gate pad 220, the data pad 630 and the storage pad 910 are formed, is aligned before the rear exposure. Then, the portion exposed to light in a display region is the hatched region in FIGS. 10A and 10B. Next, a front exposure is executed by using the first mask having openings on the portions corresponding to the drain electrode, the portions of the storage line 900 except for the portions overlapping the data line 600, the gate pad 220, the data pad 630 and the previous gate line 200, and the ITO layer 800 is patterned to form the gate ITO layer 820 and the data ITO layer 830 in FIGS. 1, 3 and 4.

In this embodiment, two exposing steps may be exchanged.

On the other hand, a storage ITO layer 840 shown in FIG. 1 is formed of the same layer as the gate ITO layer 820 and the data ITO layer 830.

Here, if the capacitance due to the overlap of the pixel electrode 810 and the previous gate line 200 is sufficient, it is not necessary to form the storage wire 900 and 910, and the storage electrode 640. Instead of forming the storage electrode 640 near the center of the pixel region, the storage electrode connected to the pixel electrode may be located between the previous gate line and the pixel electrode. This structure will be described.

Figure 11:
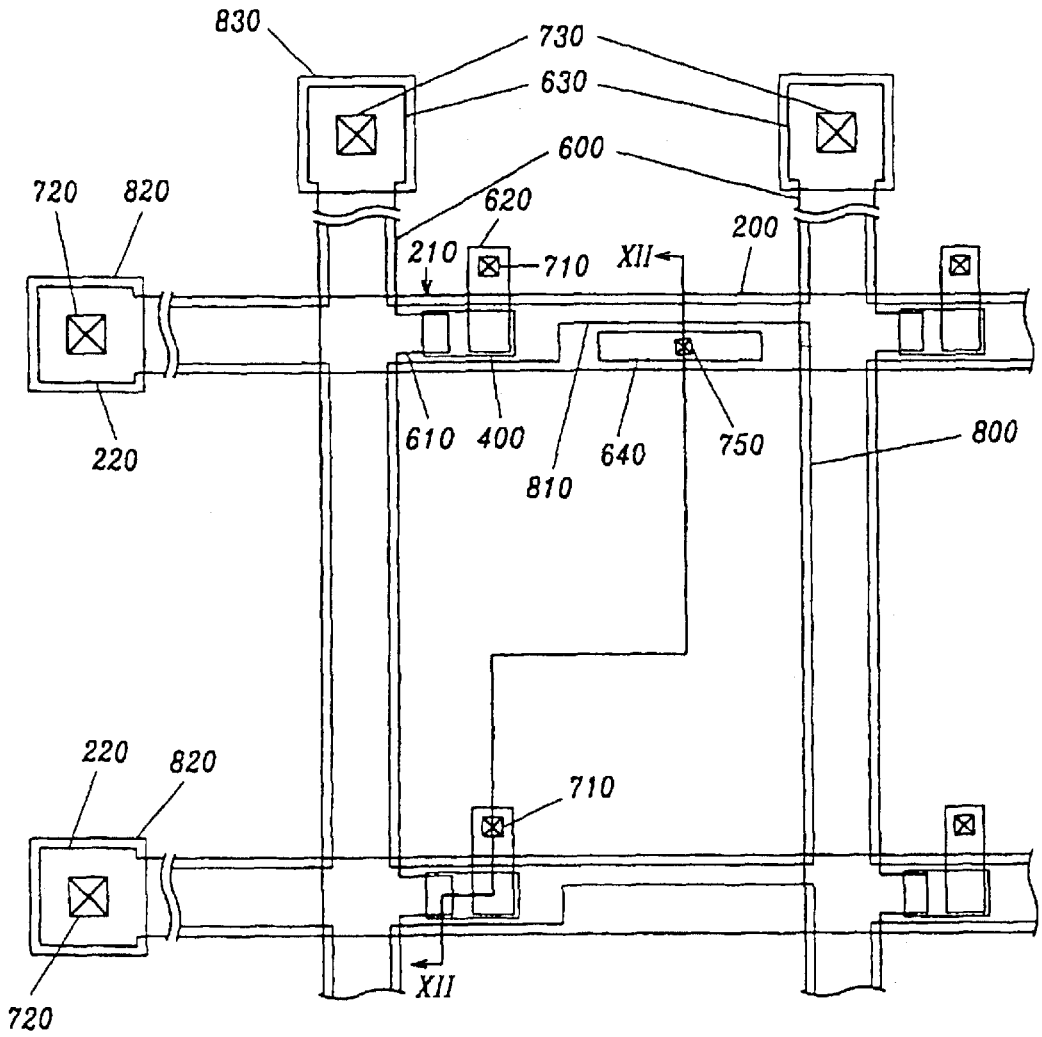
FIG. 11 is a layout view of a TFT substrate for an LCD according to the second embodiment of the present invention.
Figure 12:
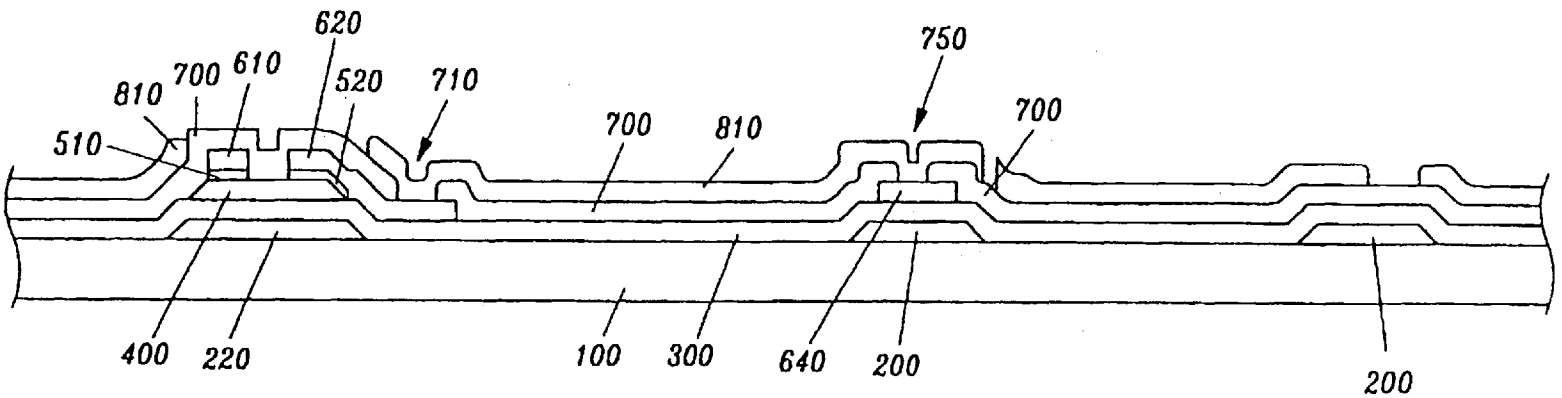
FIG. 12 shows a cross-sectional view of the TFT substrate illustrated in FIG. 10 taken along the line XII—XII.

FIG. 11 is layout view of the TFT substrate for the LCD according to the second of the present invention, and FIG. 12 is cross-sectional view taken along the line XII—XII in FIG. 10.

Most of a structure is the same as the structure of FIGS. 1 and 2, but a storage wire is omitted. A storage electrode 640 is formed on a gate insulating layer 300 over a previous gate line 200 and connected to a pixel electrode 810 through a contact hole 750 in the passivation layer 700.

Here, the structure of a gate pad and a data pad may be the same as the structure of FIGS. 3 and 4.

Accordingly, pixel defects are reduced for using the negative photoresist, and accordingly the quality of the LCD is improved. Because the pixel electrode and the data line are self-aligned to obtain the maximum aperture ratio, and to reduce the parasitic capacitance. Therefore, the thickness of the insulating layer is reduced and the sufficient storage capacitance is obtained. At this time, though a stepper is used, because the parasitic capacitance is uniform in the whole substrate, therefore the stitch defect is reduced.

What is claimed is:

[1. A manufacturing method of a thin film transistor (TFT) for a liquid crystal display comprising the steps of:

preparing a transparent substrate having a first and a second surfaces opposite each other;

forming a gate wire including a plurality of gate lines and a gate electrode connected to one of the gate lines, a channel layer located at a position corresponding to the gate electrode, a gate insulating layer between the channel layer and the gate electrode, and a data wire which includes a plurality of data lines defining a pixel region enclosed by the gate lines and the data lines, a source electrode connected to one of the data lines and the channel layer, and a drain electrode connected to the channel layer and separated from the source electrode on the first surface of the substrate;

depositing a passivation layer over the first surface of the substrate;

patterning the passivation layer to form a first contact hole exposing a portion of the drain electrode;

depositing a transparent conductive layer;

coating a negative photoresist on the transparent conductive layer;

front exposing the negative photoresist by irradiating light from the first surface of the substrate using a first mask having first openings at positions corresponding to the first contact hole and the pixel region;

developing the negative photoresist; and etching the transparent conductive layer by using the negative photoresist as an etch mask to form a pixel electrode connected to the drain electrode via the first contact hole.]

[2. The manufacturing method of claim 1, wherein the gate wire further includes a plurality of gate pads connected to the respective gate lines and formed outside the pixel regions, and the data wire further includes a plurality of data pads connected to the respective data lines and formed outside the pixel regions, the method further comprising the step of forming second contact holes and third contact holes exposing the gate pads and the data pads, respectively, and wherein the first mask has second openings at positions corresponding to the second contact holes and the third contact holes.]

[3. The manufacturing method of claim 1, further comprising the step of forming a storage wire which includes a storage line parallel to the gate lines and a storage pad connected to the storage line.]

[4. The manufacturing method of claim 3, further comprising the steps of:

forming a storage electrode overlapping the storage line via the gate insulating layer; and forming a second contact hole exposing the storage electrode in the passivation layer, wherein the pixel electrode is connected to the storage electrode through the second contact hole.]

[5. The manufacturing method of claim 1, further comprising the steps of:

forming a storage electrode overlapping one of the gate lines via the gate insulating layer; and forming a second contact hole exposing the storage electrode in the passivation layer, wherein the pixel electrode is connected to the storage electrode through the second contact hole, and the first mask has a second opening at a position corresponding to the second contact hole.]

[6. A manufacturing method of a thin film transistor (TFT) for a liquid crystal display comprising the steps of:

preparing a transparent substrate a first and a second surfaces opposite each other;

forming a gate wire including a plurality of gate lines and a gate electrode connected to one of the gate lines, a channel layer located at a position corresponding to the gate electrode, a gate insulating layer between the channel layer and the gate electrode, and a data wire which includes a plurality of data lines defining a pixel region enclosed by the gate lines and the data lines, a source electrode connected to one of the data lines and the channel layer, and a drain electrode connected to the channel layer and separated from the source electrode on the first surface of the substrate;

depositing a passivation layer over the first surface of the substrate;

patterning the passivation layer to form a first contact hole exposing a portion of the drain electrode;

depositing a transparent conductive layer;

coating a negative photoresist on the transparent conductive layer;

rear exposing the negative photoresist by irradiating light from the second surface of the substrate;

front exposing the negative photoresist by irradiating light from the first surface of the substrate and using a first mask having a first opening at positions corresponding to the first contact hole;

developing the negative photoresist; and etching the transparent conductive layer by using the negative photoresist as a etch mask to form a pixel electrode connected to the drain electrode via the first contact hole.]

[7. The manufacturing method of claim 6, wherein the gate wire further includes a plurality of gate pads connected to the respective gate lines and formed outside the pixel regions, and the data wire further includes a plurality of data pads connected to the respective data lines and formed outside the pixel regions, the method further comprising the step of forming second contact holes and third contact holes exposing the gate pads and the data pads, respectively, and wherein portions of the negative photoresist outside the pixel regions are not exposed to light in the rear exposing step, and the first mask has second openings at positions corresponding to the second contact holes and the third contact holes.]

[8. The manufacturing method of claim 6, wherein the gate wire further includes a plurality of gate pads connected to the respective gate lines and formed outside the pixel regions, and the data wire further includes a plurality of data pads connected to the respective data lines and formed outside the pixel regions, the method further comprising the steps of:

forming second contact holes and third contact holes exposing the gate pads and the data pads, respectively, wherein, portions of the negative photoresist outside the pixel regions are exposed to light in the rear exposing step, the first mask has second openings at positions corresponding to the second contact holes and the third contact holes, a first transparent conductive pattern separated from the pixel electrode and placed outside the pixel regions is formed in the etching step, and removing the negative photoresist;

coating a positive photoresist on the first transparent conductive pattern, the pixel electrode and the passivation layer;

front exposing the positive photoresist by using a second mask having a pattern covering portions of the positive photoresist on the pixel regions, the second contact hole and the third contact hole;

developing the positive photoresist; and etching the first transparent conductive pattern and the pixel electrode by using the positive photoresist as an etch mask.]

[9. The manufacturing method of claim 8, wherein the second mask has third openings on the gate lines and the data lines.]

[10. The manufacturing method of claim 6, further comprising the step of forming a storage wire on the substrate, the storage wire including a storage line parallel to the gate line and a storage pad connected to the storage line and partially overlapping the data line via the gate insulating layer on the substrate, wherein the first mask has a pattern covering a portion of the storage line overlapping the data line.]

[11. The manufacturing method of claim 10, further comprising the steps of:

forming a storage electrode overlapping the storage line via the gate insulating layer; and forming a second contact hole exposing the storage electrode in the passivation layer, wherein the pixel electrode is connected to the storage electrode through the second contact hole.]

[12. The manufacturing method of claim 6, further comprising the steps of:

forming a storage electrode overlapping the gate line via the gate insulating layer; and forming a second contact hole exposing the storage electrode in the passivation layer, wherein the pixel electrode is connected to the storage electrode through the second contact hole, and the first mask has a second opening at a position corresponding to the second contact hole.]

*13. A liquid crystal display, comprising:*

*an insulating substrate;*

*a gate wire and a data wire insulated from each other over the substrate, the gate wire including a plurality of gate lines and gate pads, and the data wire including pluralities of data lines and data pads;*

*a plurality of thin film transistors, each having a drain electrode and a source electrode electrically connected to the data line;*

*a passivation layer covering the gate lines, the data lines and the thin film transistors, the passivation layer having first, second, and third contact holes which expose the gate pad, the data pad, and the drain electrode at least in part, respectively;*

*a plurality of pixel electrodes on the passivation film, each of the pixel electrodes connected to the drain electrode through the first contact hole;*

*a first conductor including a layer different from the pixel electrode, electrically connected to the pixel electrode and serving as a terminal of a storage capacitor;*

*a second conductor on the passivation film, the second conductor connected to the gate pad through the second contact hole; and*

*a third conductor on the passivation film, the third conductor connected to the data pad through the third contact hole.*

*14. The liquid crystal display of claim 13, further comprising a fourth conductor insulated from the first conductor and overlapping the first conductor to form another terminal of the storage capacitor.*

*15. The liquid crystal display of claim 14, wherein the first conductor has a width smaller than width of the fourth conductor.*

*16. The liquid crystal display of claim 13, wherein the pixel electrode overlaps at least a part of the gate lines adjacent to the pixel electrode.*

*17. The liquid crystal display of claim 13, wherein all edges of the pixel electrode overlap the gate lines or the data lines adjacent to the pixel electrode.*

*18. The liquid crystal display of claim 17, wherein at least an overlapping portion between the pixel electrode and the gate lines has a larger width than other overlapping portions between the pixel electrode and the gate lines or the data lines.*

*19. The liquid crystal display of claim 13, wherein the pixel electrode, the second conductor and the third conductor are made of a transparent conducting material.*

* * * * *